United States Patent
Senzaki

(10) Patent No.: US 10,846,827 B2
(45) Date of Patent: Nov. 24, 2020

(54) IMAGE PROCESSING DEVICE, IMAGE PROCESSING METHOD, AND STORAGE MEDIUM

(71) Applicant: NEC Corporation, Minato-ku, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 16/308,866

(22) PCT Filed: Jun. 13, 2017

(86) PCT No.: PCT/JP2017/021774
§ 371 (c)(1),
(2) Date: Dec. 11, 2018

(87) PCT Pub. No.: WO2017/217395
PCT Pub. Date: Dec. 21, 2017

(65) Prior Publication Data
US 2020/0311876 A1 Oct. 1, 2020

(30) Foreign Application Priority Data
Jun. 14, 2016 (JP) .................................. 2016-118057

(51) Int. Cl.
*G06T 5/00* (2006.01)
(52) U.S. Cl.
CPC .... *G06T 5/002* (2013.01); *G06T 2207/20021* (2013.01)

(58) Field of Classification Search
CPC . G06T 5/00; G06T 5/002; G06T 2207/20021; G06T 2207/20024; G06T 2207/20028; G06K 9/40; G06K 9/44
See application file for complete search history.

(56) References Cited

U.S. PATENT DOCUMENTS

2016/0012569 A1* 1/2016 Hanada ................. G06T 3/4038
382/131

FOREIGN PATENT DOCUMENTS

JP    07-307942 A    11/1995    ............... H04N 7/30
JP    2003-153004 A    5/2003    ............. H04N 1/409

OTHER PUBLICATIONS

Zeev Farbman et al., "Edge-Preserving Decompositions for Multi-Scale Tone and Detail Manipulation", ACM Trans. Graph. vol. 27, No. 3, 2008, 10 pages total.
Dongbo Min et al., "Fast Global Image Smoothing Based on Weighted Least Squares", IEEE Transaction on Image Processing, vol. 23, No. 12, pp. 5638-5653, 2014, 15 pages total.

(Continued)

*Primary Examiner* — Andrew W Johns

(57) ABSTRACT

The purpose of the present invention is to reduce required calculation resources for image smoothing based on weighted least squares. The image processing device 100 includes: a first smoothing unit 110 for applying one-dimensional first smoothing processing based on weighted least squares to an input image in a first direction per a predetermined number of lines; and a second smoothing unit 120 for applying one-dimensional second smoothing processing based on weighted least squares to the first-smoothing-processed input image in a second direction, which is different from the first direction, per a predetermined block.

15 Claims, 10 Drawing Sheets

(56) References Cited

OTHER PUBLICATIONS

International Search Report dated Sep. 5, 2017 issued by the International Searching Authority in PCT/JP2017/201774.
Written Opinion dated Sep. 5, 2017 issued by the International Searching Authority in PCT/JP2017/201774.

* cited by examiner

IMAGE PROCESSING DEVICE, IMAGE PROCESSING METHOD, AND STORAGE MEDIUM

This application is a National Stage Entry of PCT/JP2017/021774 filed on Jun. 13, 2017, which claims priority from Japanese Patent Application 2016-118057 filed on Jun. 14, 2016, the contents of all of which are incorporated herein by reference, in their entirety.

TECHNICAL FIELD

The present disclosure relates to image processing.

BACKGROUND ART

A method of separating image signals into structural components and vibration components is known as pre-processing for noise reduction. The structural component herein means a component having flat regions and strong edges of an image, and is also referred to as a skeleton component. The vibration component means a differential signal between the input image signal and the structural component, and has a texture component and a noise component. For example, by reducing noise of the vibration component separated from the image signal and combining the noise-reduced vibration component with the structural component, noise can be reduced while maintaining edges and textures of the image.

As techniques related to such separation of image signals, techniques disclosed in NPL 1 and 2 are known. NPL 1 and 2 disclose smoothing of images based on a weighted least squares method. Hereinafter, a filter for smoothing an image on the basis of the weighted least squares method is also referred to as "weighted least squares (WLS) filter".

CITATION LIST

Non Patent Literature

[NPL 1] Zeev Farbman, Raanan Fattal, Dani Lischinski, Richard Szeliski: Edge-preserving decompositions for multi-scale tone and detail manipulation. ACM Trans. Graph. 27(3) (2008).
[NPL 2] Dongbo Min, Sunghwan Choi, Jiangbo Lu, Bumsub Ham, Kwanghoon Sohn, Minh N. Do: Fast Global Image Smoothing Based on Weighted Least Squares. IEEE Transactions on Image Processing 23(12): 5638-5653 (2014).

SUMMARY OF INVENTION

Technical Problem

The techniques disclosed in NPL 1 and 2 have a technical problem in that, for example, an amount of usage of memory is large.

An exemplary object of the present disclosure is to reduce computational resources required in smoothing of an image based on the weighted least squares method.

Solution to Problem

In one aspect, the provided is an image processing device including: first smoothing means for executing one-dimensional first smoothing processing based on a weighted least squares method on an input image in each predetermined line in a first direction; and second smoothing means for executing one-dimensional second smoothing processing based on a weighted least squares method on the input image on which the first smoothing processing has been performed, for each predetermined block in a second direction different from the first direction.

In another aspect, the provided is an image processing method including: executing one-dimensional first smoothing processing based on a weighted least squares method on an input image in each predetermined line in a first direction; and executing one-dimensional second smoothing processing based on a weighted least squares method on the input image on which the first smoothing processing has been performed, for each predetermined block in a second direction different from the first direction.

In still another aspect, the provided is a computer-readable program storage medium storing a program that cause a computer to perform: processing for executing one-dimensional first smoothing processing based on a weighted least squares method on an input image in each predetermined line in a first direction; and processing for executing one-dimensional second smoothing processing based on a weighted least squares method on the input image on which the first smoothing processing has been performed, for each predetermined block in a second direction different from the first direction.

Advantageous Effects of Invention

According to the present disclosure, in smoothing of an image based on the weighted least squares method, required calculation resources are reduced.

EXAMPLE EMBODIMENT

[Wls Filter]

Figure 1:
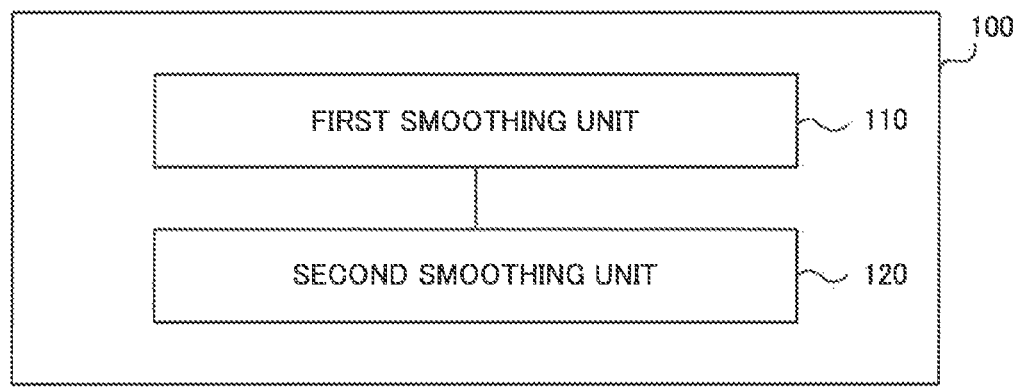
FIG. 1 is a block diagram illustrating an example of a configuration of an image processing device.

In a general WLS filter, when an input image is denoted by f and a guide image related to the input image is denoted by g, for example, an image signal u that causes an energy J(u) expressed by the following equation (1) to be a minimum is calculated, and u is output as a structural component (see, for example, NPL 2). Each of p and q represents a position of a pixel. λ represents a parameter for adjusting the balance between the first term and the second term on the right side. N(p) represents a set of neighboring pixels. The neighboring pixel referred to herein is, for example, eight pixels surrounding a given pixel.

$$J(u) = \sum_p \left( (u_p - f_p)^2 + \lambda \sum_{q \in N(p)} w_{p,q}(g)(u_p - u_q)^2 \right) \quad (1)$$

The guide image is an image correlated with the input image. For example, the guide image is an image obtained by capturing a scene that is same as the scene in the input image under different conditions. More specifically, the guide image may be an image obtained by capturing a subject that is same the subject in the input image with flash, when the input image is captured without flash. Alternatively, the guide image may be a near infrared image obtained by abstracting the near infrared component from the input image. The guide image may be the input image itself. It is assumed herein that g=f holds, i.e., the guide image and the input image are the same.

$w_{p,q}(g)$ is a weight determined on the basis of the similarity between a pixel value of the pixel p and a pixel value of the pixel q. $w_{p,q}(g)$ can be expressed by the following equation (2) using the parameter $\sigma_c$. The pixel value referred to herein is a numerical value representing brightness, luminance, and the like of the pixel, and is represented in monochrome or color. The pixel value referred to herein is, for example, a gradation value represented under a predetermined color space.

$$w_{p,q}(g) = \exp(-\|g_p - g_q\| \sigma_c) \quad (2)$$

The value of u that causes J(u) expressed by equation (1) to be a minimum is calculated by solving the linear equation expressed by equation (3) below. "I" is an identity matrix. The elements of matrix A are expressed by expression (4) below.

$$(I + \lambda A)u = f \quad (3)$$

$$A(m, n) \begin{cases} \sum_{l \in N(m)} w_{m,l}(g) & n = m \\ -w_{m,n}(g) & n \in N(m) \\ 0 & \text{otherwise} \end{cases} \quad (4)$$

According to equation (3), u is obtained by calculating the inverse matrix of the matrix (I+λA). That is, u satisfies equation (5) below.

$$u = (I + \lambda A)^{-1} f \quad (5)$$

When the number of pixels that corresponds to the width of the input image is denoted by W, the number of pixels that corresponds to the height is denoted by H, and the number of pixels that corresponds to the area is denoted by S (=W×H), u and f are vectors of S components, and "I" and A are matrixes having S rows and S columns. Therefore, in order to calculate u using equation (5), it is necessary to calculate a large inverse matrix, and calculation resources (memory, processing ability, processing time, etc.) are required.

In contrast, there is a method of executing the operation corresponding to equation (1) separately for the horizontal direction and the vertical direction (refer to NPL 2), not for the entire image. That is, in this method, the two-dimensional WLS filter is separated into two one-dimensional filters, i.e., a filter in the horizontal direction and a filter in the vertical direction. For convenience of description, in the following, such one-dimensional WLS filter is also referred to as "Fast WLS filter".

Then, N(m) in expression (4), that is, the set of neighboring pixels is only pixels adjacent in either the horizontal direction or the vertical direction. Therefore, the matrix (I+λA) in equation (3) is a tridiagonal matrix. Therefore, according to this method, it is possible to calculate u only by forward erasing and backward substitution without calculating an inverse matrix.

However, even when Fast WLS filter is used, the filter processing in the horizontal direction must be already completed when starting the filter processing in the vertical direction, and therefore, there is a problem that a delay occurs. In this case, the memory for temporarily storing the image (so-called intermediate image) on which the filter processing in the horizontal direction is executed is required to have a capacity to store not part of but the entire of the input image.

The example embodiment according to the present disclosure solves this problem occurring in smoothing processing based on a weighted least squares method, and makes smoothing processing based on the weighted least squares method be possible with less calculation resources. The details are as follows.

First Example Embodiment

FIG. 1 is a block diagram illustrating a configuration of an image processing device 100 according to an example embodiment. The image processing device 100 includes at least a first smoothing unit 110 and a second smoothing unit 120. The image processing device 100 executes smoothing processing on the input image and outputs processed data.

The first smoothing unit 110 performs one-dimensional smoothing processing based on the weighted least squares method on the input image. The first smoothing unit 110 executes smoothing processing for each predetermined line in a first direction. The first direction is, for example, when the image is constituted of pixels arranged in the horizontal direction and the vertical direction, one of these directions. A batch for which the smoothing processing is executed by the first smoothing unit 110 may be one line or multiple lines.

The smoothing processing by the first smoothing unit 110 is also hereinafter referred to as "first smoothing processing". The first smoothing processing is performed using, for example, Fast WLS filter, but another one-dimensional filter that enables smoothing of the image may be used.

The second smoothing unit 120 executes one-dimensional smoothing processing based on the weighted least squares method on the input image on which the first smoothing processing is executed by the first smoothing unit 110. The second smoothing unit 120 executes smoothing processing for each predetermined block in the second direction different from the first direction. When the image is constituted of pixels arranged in the horizontal direction and the vertical direction, the second direction is a direction orthogonal to the first direction. The block referred to herein is not the entire image but is a part of the image.

The smoothing processing by the second smoothing unit 120 is also hereinafter referred to as "second smoothing processing". The second smoothing processing differs from first smoothing processing (which is executed for a batch of all the pixels arranged in the first direction) in that the second smoothing processing is executed for a batch of part (i.e. not all) of pixels arranged in the second direction. The second smoothing processing may be similar to the first smoothing processing except for a batch and direction of processing.

Figure 2:
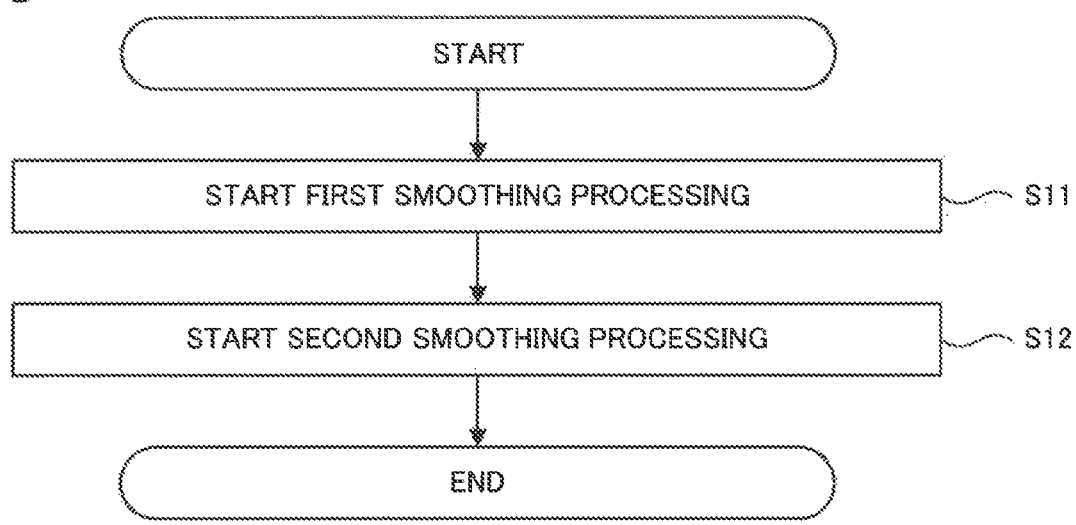
FIG. 2 is a flowchart illustrating an example of processing executed by the image processing device.

FIG. 2 is a flowchart illustrating processing executed by the image processing device 100. In step S11, the first smoothing unit 110 starts the first smoothing processing on the input image. The first smoothing unit 110 executes first smoothing processing for each predetermined line. For example, the first smoothing unit 110 repeats the operation of executing first smoothing processing on the first line of the input image and then executing similar processing on the second line.

In step S12, the second smoothing unit 120 starts second smoothing processing on the input image for which first smoothing processing has been performed by the first smoothing unit 110. The timing at which the second smoothing unit 120 starts the processing of step S12 is at the timing when (or after) the first smoothing unit 110 finishes executing the first smoothing processing on the input image for one block.

Figure 3A:
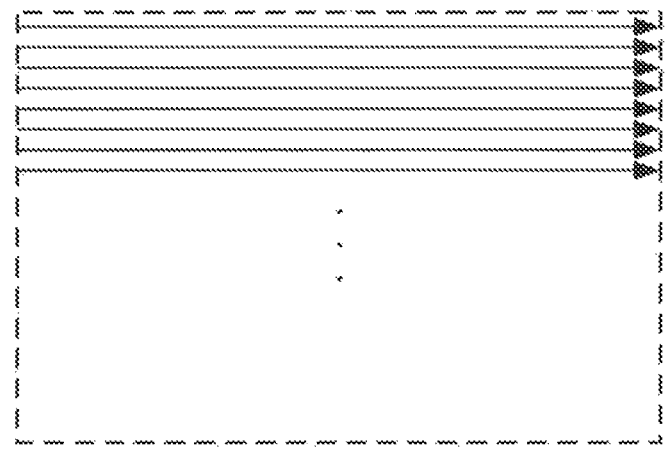
FIG. 3A is a schematic diagram illustrating an example of an execution procedure of first smoothing processing.
Figure 3B:
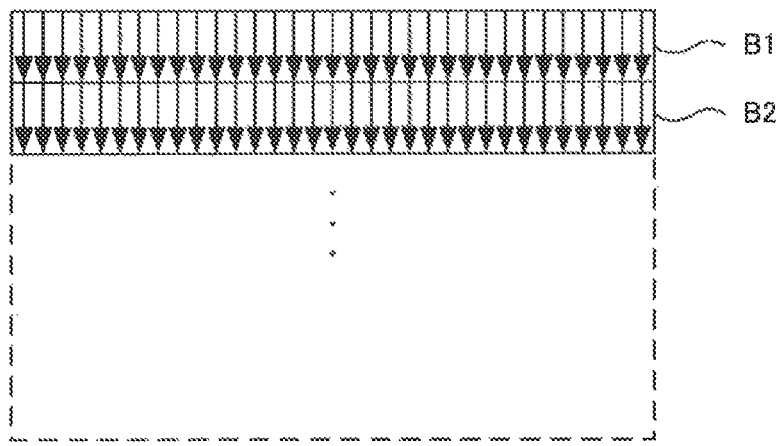
FIG. 3B is a schematic diagram illustrating an example of an execution procedure of second smoothing processing.
Figure 3C:
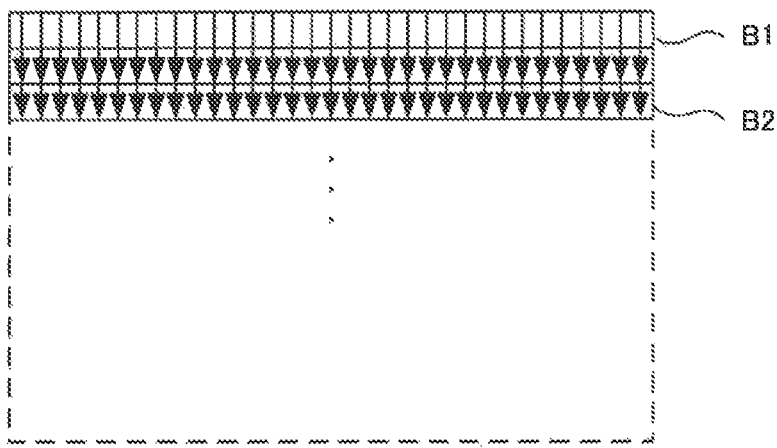
FIG. 3C is a schematic diagram illustrating another example of the execution procedure of the second smoothing processing.

FIG. 3A, FIG. 3B, and FIG. 3C are schematic diagrams illustrating execution procedures of the first smoothing processing and the second smoothing processing. The first smoothing processing is executed for each batch of predetermined line(s) (may be one line or a plurality of lines) as illustrated in FIG. 3A. That is, when the first smoothing unit 110 executes the processing on a certain line, the first smoothing unit 110 executes the processing for all of the pixels of the line in batch.

In contrast, the second smoothing processing is executed for each predetermined block as illustrated in FIG. 3B and FIG. 3C. In the example of FIG. 3B, the second smoothing unit 120 sequentially repeats operations such as executing the second smoothing processing on a block B1 and then executing the second smoothing processing on a block B2. In this example, the second smoothing unit 120 performs vertical second smoothing processing for each column, using pixels within a range of the block.

The difference between the example of FIG. 3B and the example of FIG. 3C is whether or not adjacent blocks contain common pixels. The second smoothing unit 120 may perform the second smoothing processing according to any of these examples. Details of the operation in the case of FIG. 3C, i.e., the case where the blocks overlap with each other, will be explained in the second example embodiment.

As described above, the image processing device 100 according to the present example embodiment has a configuration to execute second smoothing processing for each predetermined block. This configuration allows the execution timing of the second smoothing processing to be accelerated as compared to a configuration in which the second smoothing processing is executed after the first smoothing processing is executed on the entire input image. Further, the configuration according to the present example embodiment allows the capacity of the memory for temporarily storing the input image on which the first smoothing processing is executed to be reduced, as compared to the configuration in which the second smoothing processing is executed after the first smoothing processing is executed on the entire input image. Therefore, the image processing device 100 can reduce the computational resources required in smoothing the image based on the weighted least squares method.

Second Example Embodiment

Figure 4:
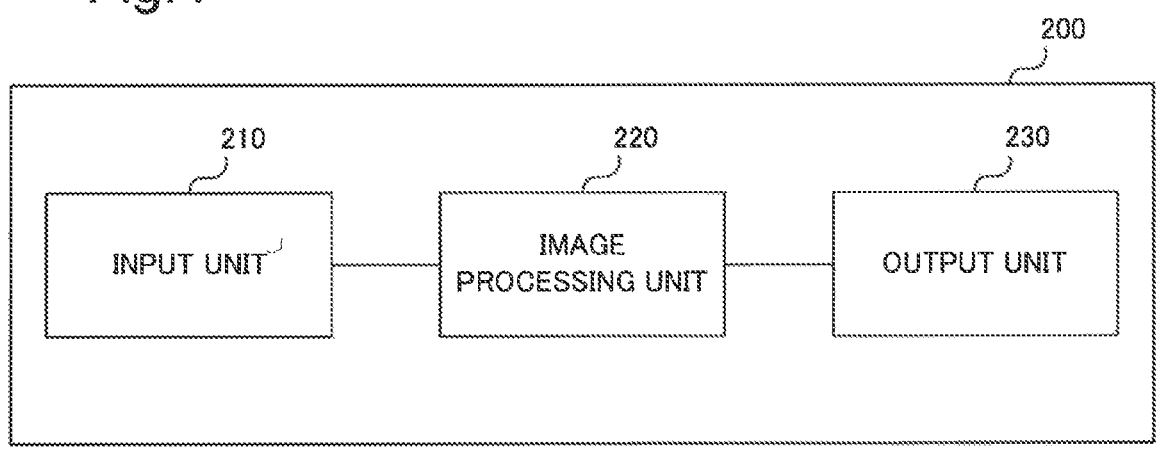
FIG. 4 is a block diagram illustrating an example of a configuration of an image processing system.

FIG. 4 is a block diagram illustrating a configuration of an image processing system 200 according to another example embodiment. The image processing system 200 includes an input unit 210, an image processing unit 220, and an output unit 230. The image processing unit 220 corresponds to an example of the image processing device 100 of the first example embodiment.

The input unit 210 receives input of image data. The input unit 210 provides image data for the image processing unit 220. The input unit 210 may include, for example, an imaging device such as a digital camera or an image scanner, or a database in which image data is recorded. Alternatively, the input unit 210 may include a wired or wireless communication interface connected to such an imaging device or database. The input unit 210 may include an input buffer for temporarily storing image data. The image represented by the image data input to the image processing unit 220 via the input unit 210 is also referred to as "input image" below.

The image processing unit 220 executes image processing on the image data input via the input unit 210. The image processing executed by the image processing unit 220 includes at least smoothing processing based on a weighted least squares method. The image processing unit 220 may execute image processing other than smoothing processing before or after the smoothing processing.

The output unit 230 outputs the image data on which image processing has been executed by the image processing unit 220. The output here includes display of image, recording of image, transmission of image or the like. The output unit 230 may include a display device, an image forming device (such as a printer), a storage device (or a storage medium), or the like. Alternatively, the output unit 230 may include a wired or wireless communication interface connected to such a device. Also, the output unit 230 may be configured integrally with the input unit 210. The output unit 230 may include an output buffer for temporarily storing image data after image processing.

Figure 5:
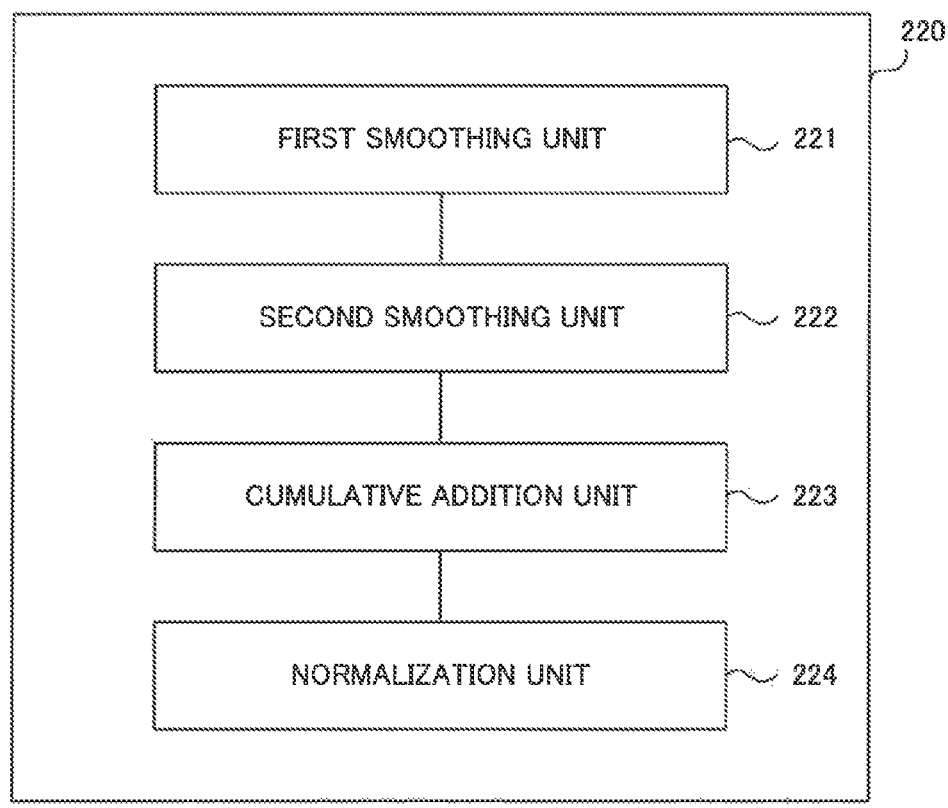
FIG. 5 is a block diagram illustrating an example of a configuration of an image processing unit.

FIG. 5 is a block diagram illustrating a configuration of an image processing unit 220. The image processing unit 220 includes a first smoothing unit 221, a second smoothing unit 222, a cumulative addition unit 223, and a normalization unit 224.

The first smoothing unit 221 performs one-dimensional smoothing processing on the input image based on the weighted least squares method. The first smoothing unit 221 executes the first smoothing processing as the first smoothing unit 110 according to the first example embodiment executes.

The second smoothing unit 222 performs one-dimensional smoothing processing based on the weighted least squares method on the input image on which the first smoothing processing has been executed by the first smoothing unit 221. The second smoothing unit 222 performs the second smoothing processing as the second smoothing unit 120 according to the first example embodiment executes.

The second smoothing unit 222 executes the second smoothing processing by causing the blocks to be overlapped as illustrated in FIG. 3C. The second smoothing unit 222 executes the second smoothing processing in a manner according to a predetermined redundancy. The redundancy herein refers to the number of output values (estimated values) of WLS filter per pixel. The redundancy in the present example embodiment is a constant value in any pixel except for pixels at the top and bottom of image. Overlapping blocks are fewer at the top and bottom of image).

The cumulative addition unit 223 cumulatively adds input images for which the second smoothing processing has been executed by the second smoothing unit 222. The cumulative addition unit 223 cumulatively adds values output by the second smoothing unit 222 for each pixel. In other words, the cumulative addition unit 223 cumulatively adds values of each pixel output by the second smoothing unit 222 the number of times according to the redundancy.

The normalization unit 224 normalizes the input image cumulatively added by the cumulative addition unit 223 according to the redundancy. The normalization herein is to divide the output value from the second smoothing unit 222 by a predetermined numerical value. For example, the normalization unit 224 may divide the output value from the second smoothing unit 222 by a numerical value according to the redundancy.

Figure 6:
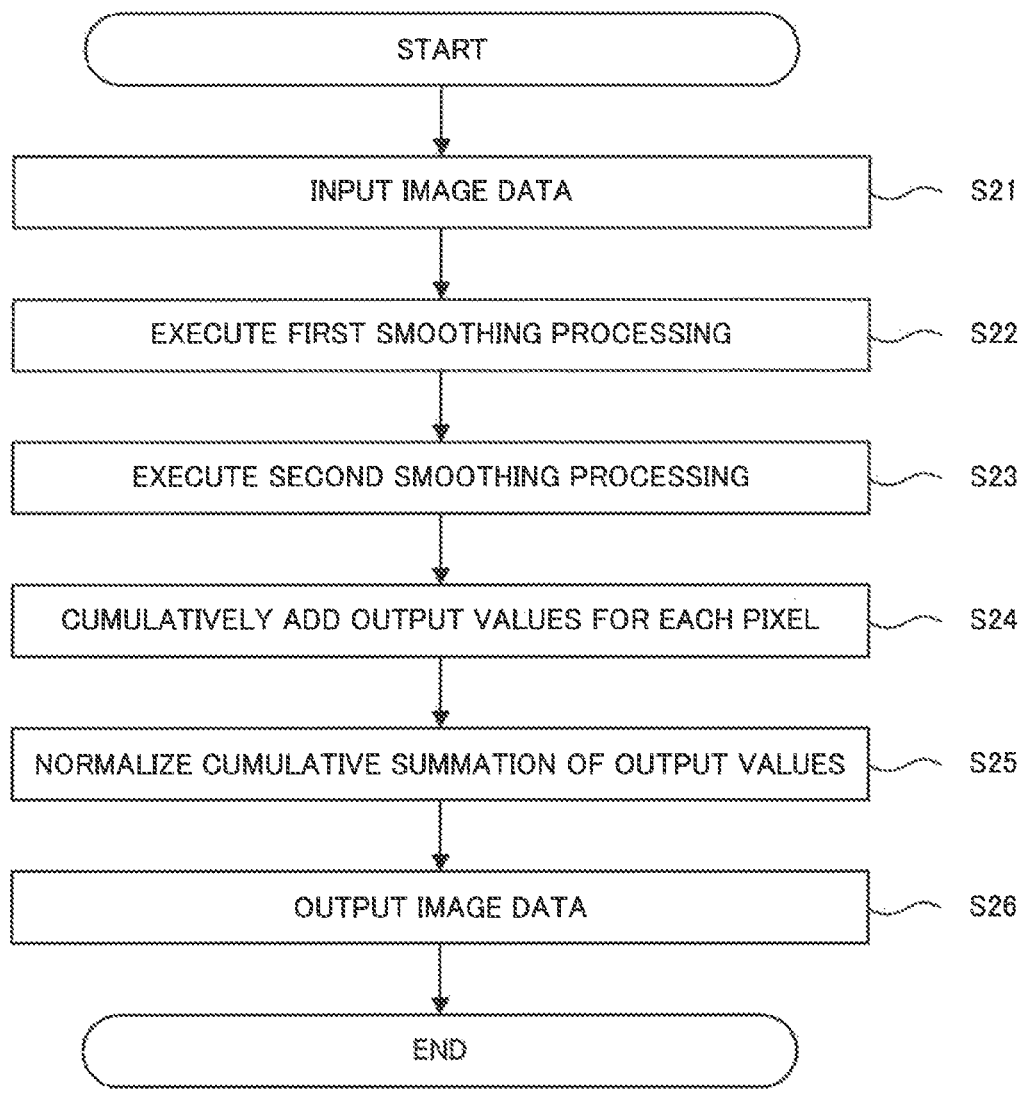
FIG. 6 is a flowchart illustrating an example of processing executed by the image processing system.

FIG. 6 is a flowchart illustrating an example of processing executed by the image processing system 200. In step S21, the input unit 210 receives input of image data. In step S22, the first smoothing unit 221 performs the first smoothing processing on the input image. In step S23, the second smoothing unit 222 performs the second smoothing processing on the input image on which the first smoothing processing has been executed.

In step S24, the cumulative addition unit 223 cumulatively adds the output values provided by the second smoothing unit 222 for each pixel. In step S25, the normalization unit 224 normalizes cumulative summation of the values output by the cumulative addition unit 223. The normalization unit 224 performs the normalization in order from the pixel on which cumulative addition has been completed. In step S26, the output unit 230 outputs the image data on which image processing, which are illustrated in steps S22 to S25, has been executed.

The image processing unit 220 may execute different processing depending on the presence or absence of overlapping blocks. For example, the image processing unit 220 may execute the processing illustrated in FIG. 6 when there is overlap of blocks, and the image processing unit 220 may omit (skip) the processing of steps S24 and S25 when there is no overlap of blocks.

As described above, the image processing system 200 according to the present example embodiment has a configuration to execute the second smoothing processing block by block. This configuration, like the image processing device 100 of the first example embodiment, can reduce the required computational resources. Further, the image processing system 200 has a configuration to execute the second smoothing processing in which the blocks is overlapped and cumulatively add and normalize the output values. In other words, the image processing system 200 according to the present example embodiment has a configuration to redundantly execute the second smoothing processing. With this configuration, the image processing system 200 can improve the image quality of the output image.

When there is no overlapping of the blocks, a gap of gradation values may occur in the portion corresponding to the boundary of the blocks in the image, which makes the boundary of the blocks to be conspicuous (to be easily visually recognized), possibly degrading the image quality of the output image. On the other hand, as in the present example embodiment, when the blocks are overlapped and cumulative addition and normalization are performed on the output values from the second smoothing unit 222, for example, the gap of gradation values in an image in which the gradation continuously changes is less likely to occur. Therefore, according to the image processing system 200 of the present example embodiment, the image quality of the output image can be improved as compared with the case of not having the configuration in which the blocks are overlapped.

Third Example Embodiment

Figure 7:
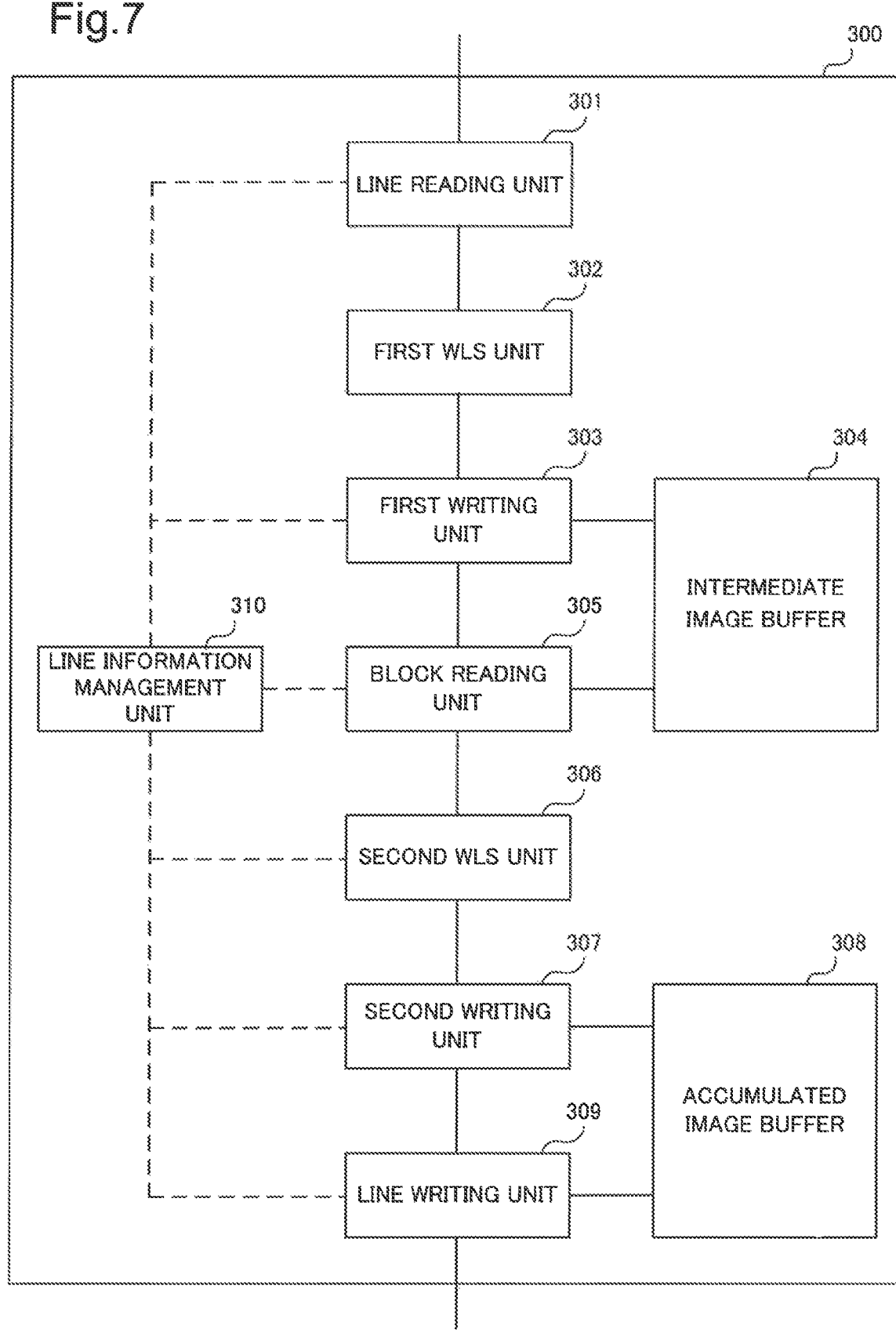
FIG. 7 is a block diagram illustrating another example of a configuration of the image processing unit.

FIG. 7 is a block diagram illustrating a configuration of an image processing unit 300 according to still another example embodiment. The image processing unit 300 is a component that is compatible with the image processing unit 220 of the second example embodiment. It can also be said that the image processing unit 300 corresponds to a specific example of the image processing unit 220.

The image processing unit 300 includes a line reading unit 301, a first WLS unit 302, a first writing unit 303, an intermediate image buffer 304, a block reading unit 305, a second WLS unit 306, a second writing unit 307, an accumulated image buffer 308, a line writing unit 309, and a line information management unit 310.

The line reading unit 301 reads the image data for each predetermined line. In the following description, it is assumed that the line reading unit 301 reads the image data line by line. The line reading unit 301 provides the read image data for the first WLS unit 302.

The first WLS unit 302 performs one-dimensional WLS filter processing in a line direction (horizontal direction) on the image data of one line read by the line reading unit 301. The first WLS unit 302 provides the image data on which the WLS filter processing has been executed for the first writing unit 303. The first writing unit 303 writes the image data on which the WLS filter processing has been executed to the intermediate image buffer 304.

The intermediate image buffer 304 temporarily stores the image data written by the first writing unit 303. The intermediate image buffer 304 may have a storage capacity for as many lines as a predetermined number which is smaller than the number of all lines of the image data. When the image data of predetermined number of lines is stored and the image data of another line is newly written in the intermediate image buffer 304, the image data of the line written earliest in the existing image data is overwritten with new image data.

For convenience of explanation, in the following description, the image data stored in the intermediate image buffer 304 is also referred to as "intermediate image data", and the image represented by the image data is also referred to as "intermediate image". It can be said that the intermediate image referred to herein is, in other words, an image in which WLS filter processing is executed only in one direction and not executed in another direction.

The block reading unit 305 reads the image data stored in the intermediate image buffer 304 block by block. The block reading unit 305 is configured to read the image data when image data of one block or more is stored in the intermediate image buffer 304. The block reading unit 305 provides the read image data for the second WLS unit 306.

The second WLS unit 306 executes one-dimensional WLS filter processing on the image data in units of blocks read by the block reading unit 305. The second WLS unit 306 performs the WLS filter processing in a direction different from first WLS unit 302. That is, the second WLS unit 306 performs the WLS filter processing vertically. The second WLS unit 306 executes such WLS filter processing for each column of the image data in units of blocks. The second WLS unit 306 provides the image data on which the WLS filter processing has been executed for the second writing unit 307.

The second writing unit 307 writes the image data on which the WLS filter processing has been executed by the second WLS unit 306 to the accumulated image buffer 308. The second writing unit 307 is configured to write the output values of the second WLS unit 306 for each pixel. That is, the second writing unit 307 writes the output values of the second WLS unit 306 in the accumulated image buffer 308 in such a way that output values for the same pixel are cumulatively added.

The accumulated image buffer 308 temporarily stores the image data written by the second writing unit 307. The accumulated image buffer 308 is configured to store the output values of the second WLS unit 306 for each pixel. That is, the accumulated image buffer 308 is configured to cumulatively add output values for the same pixel.

The line writing unit 309 reads the image data stored in the accumulated image buffer 308 and normalizes and writes the image data. The line writing unit 309, for example, writes the normalized image data to the output buffer. The line writing unit 309 executes reading of the image data stored in the accumulated image buffer 308 line by line.

The line information management unit 310 manages line information. The line information herein is information for specifying a processing target line. The line information is, for example, numbers in ascending (or descending) order representing lines of the image data. The line information according to the present example embodiment may be hereinafter denoted by "y", assuming that numbers are given in ascending order in which the first line is denoted by "0", the second line is denoted by "1", . . . and the (n+1)th line is denoted by "n". In FIG. 7, the path of the line information is indicated by a broken line.

The detailed operation of each unit of the image processing unit 300 is as follows. In the following description, it is assumed that the size of the block corresponds to eight lines. Further, it is assumed that the storage capacity of the intermediate image buffer 304 is a capacity for n lines. Specifically, it is assumed that the storage capacity of the intermediate image buffer 304 is equivalent to data size of image data of one block (n=8).

Figure 8:
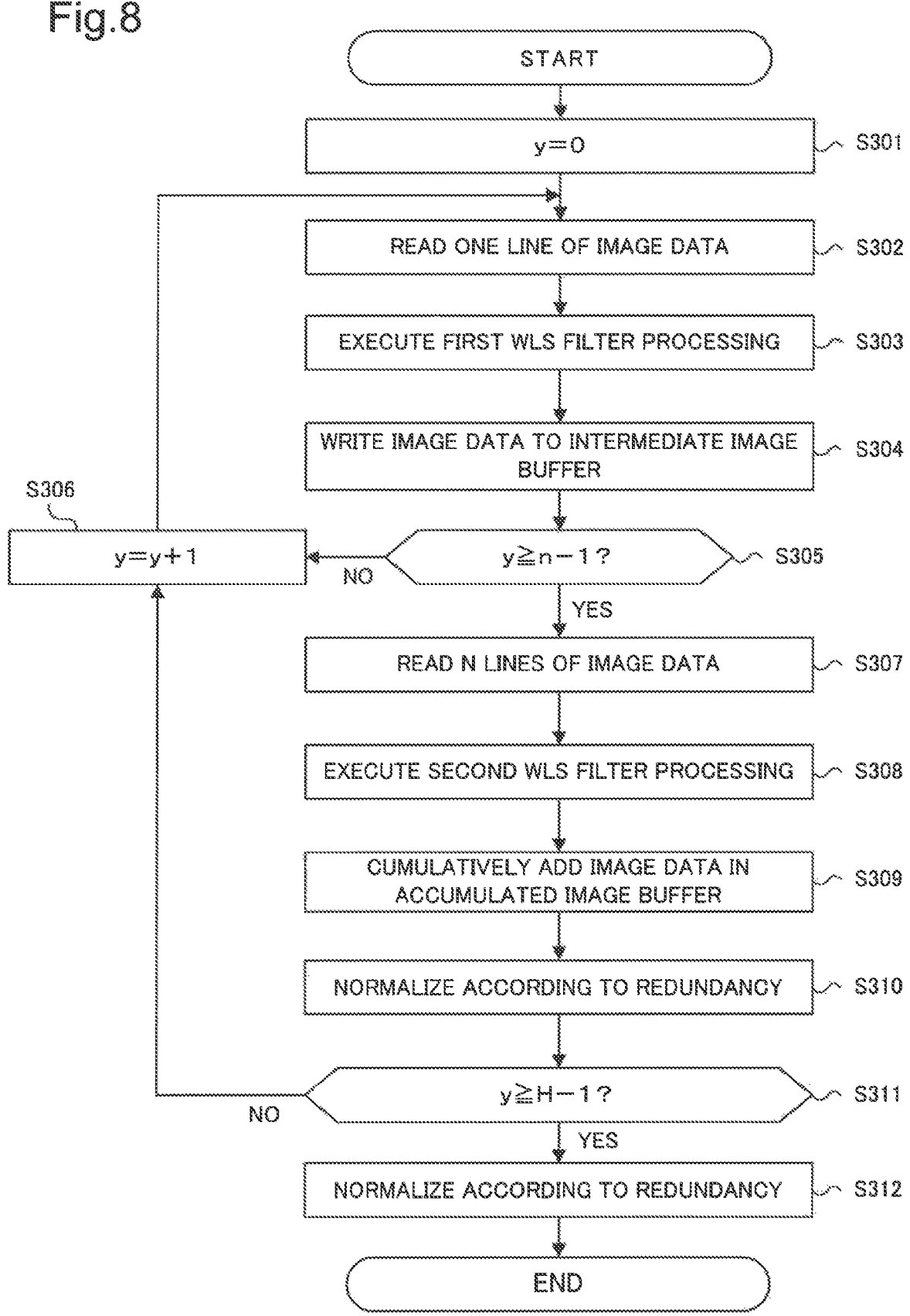
FIG. 8 is a flowchart illustrating an example of processing executed by the image processing unit.

FIG. 8 is a flowchart illustrating an example of processing executed by the image processing unit 300. In step S301, the line information management unit 310 initializes the line information y. Specifically, the line information management unit 310 sets the line information y to "0".

In step S302, the line reading unit 301 reads the image data of the line according to the line information y. For example, when y=0, the line reading unit 301 reads the line of the first line of the image data. Similarly, when y=1, the line reading unit 301 reads the line of the second line of the image data.

In step S303, the first WLS unit 302 executes the WLS filter processing on the image data of the line read out by the line reading unit 301. In step S304, the first writing unit 303 writes the image data on which the WLS filter processing has been executed to the intermediate image buffer 304.

In step S305, the line information management unit 310 determines whether the line information y is equal to or larger than (n−1). When the line information y is smaller than (n−1) (S305: NO), the line information management unit 310 increments line information y in step S306. Specifically, the line information management unit 310 increments y by "1".

After step S306, the processing of steps S302 to S305 is executed again. In step S304, the first writing unit 303 writes the image data to the intermediate image buffer 304 as follows. The intermediate image buffer 304 is represented by a matrix $v_{mid}$. An element at the i-th row and the j-th column of the intermediate image buffer 304 is denoted by $v_{mid}(i, j)$.

The output values of one line of first WLS unit 302 are denoted by $v_{hwls}$, and the element of the j-th column is denoted by $v_{hwls}(j)$. Further, when the number of pixels per line of image data (that is, the number of pixels in the horizontal direction) is denoted by W, $v_{mid}$ and $v_{hwls}$ satisfy the relationship of the following equation (6). Note that k satisfies k=y mod n. That is, k corresponds to the remainder of dividing y by n.

$$v_{mid}(k,j)=v_{hwls}(j), j=\{0,1,\ldots,W-1\} \quad (6)$$

Figure 9A:
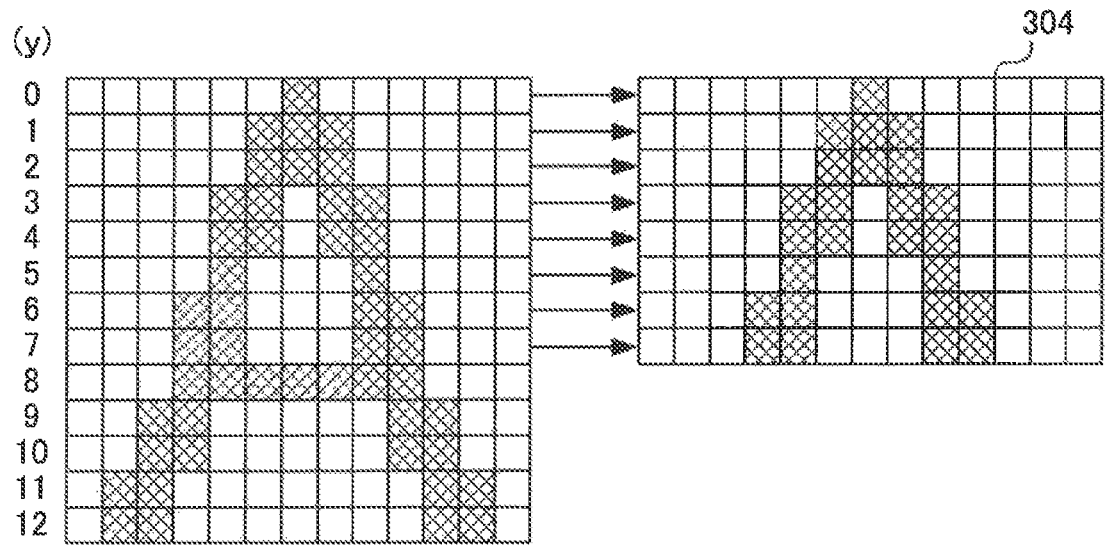
FIG. 9A is a schematic diagram illustrating an example of data stored in an intermediate image buffer.
Figure 9B:
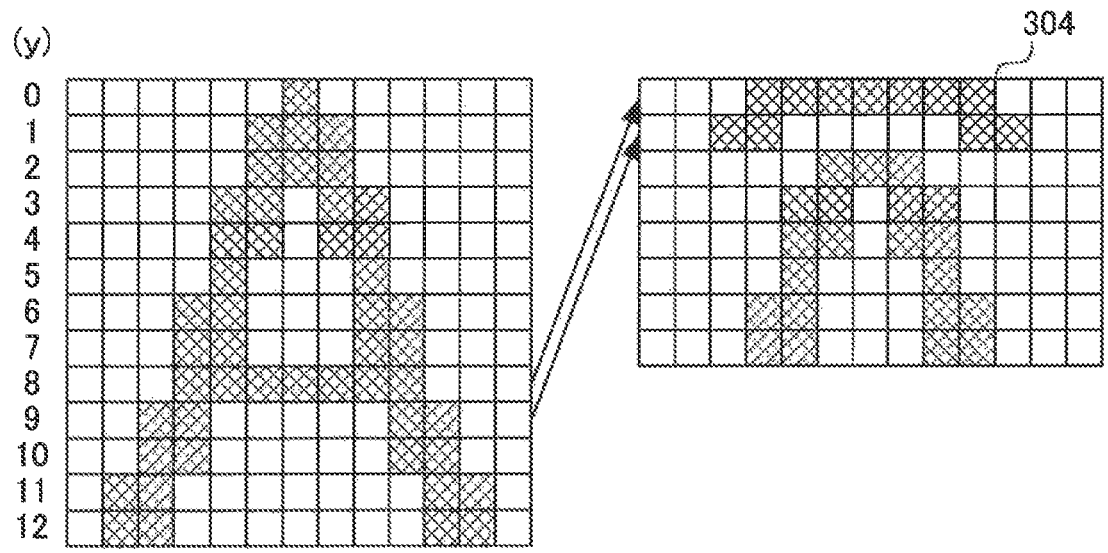
FIG. 9B is a schematic diagram illustrating another example of data stored in the intermediate image buffer.

FIG. 9A and FIG. 9B are schematic diagrams illustrating examples of data stored in the intermediate image buffer 304. FIG. 9A is a diagram illustrating an example where the intermediate image buffer 304 stores image data of eight lines from y=0 to y=7. FIG. 9B illustrates an example in which the intermediate image buffer 304 further stores image data for two lines y=8, 9 after the state illustrated in FIG. 9A.

The image data for two lines y=8, 9 are written in the storage area in which the image data of the lines y=0, 1 are stored. At the timing when the image data of the line of y=8 is written, the block reading unit 305 has already read the image data of the line of y=0. Therefore, the first writing unit 303 can overwrite the image data of the line y=0 written in the storage area with the image data of the line y=8.

In this way, it is sufficient for the intermediate image buffer 304 to have storage capacity for n lines. Therefore, according to this configuration, the intermediate image buffer 304 can operate with less storage capacity as compared with a case where the intermediate image buffer 304 has a storage capacity for all of the lines of the image data.

When the line information y is (n−1) or more (S 305: YES), the block reading unit 305 executes the processing of step S307. In step S307, the block reading unit 305 collectively reads image data for n lines from the intermediate image buffer 304.

As illustrated in FIG. 9B, the image data stored in the intermediate image buffer 304 is not necessarily stored so that the image data can be sequentially read by raster scan. Therefore, the block reading unit 305 specifies the first line to be read using m satisfying m=(y+1) mod n, and thereafter increments m by (n−1) times to read image data for n lines.

The block reading unit 305 calculates line information so as not to exceed the number of lines of the intermediate image buffer 304. Specifically, the block reading unit 305 uses m' that satisfies m'=m mod n as line information. When it is assumed that $v'_{mid}$ is the image data read by the block reading unit 305, each element $v'_{mid}(l, j)$ satisfies the following equation (7).

$$v'_{mid}(l,j)=v_{mid}(m',j), \quad (7)$$

where m'=(y+1+l)mod n, l={0, 1, ..., n−1}, j={0, 1, ..., W−1}

For example, the example in FIG. 9B illustrates the case where y=9. In this case, the block reading unit 305 cyclically reads data of 8 lines starting from the third line of the intermediate image buffer 304 because m=(9+1) mod 8=2, thereby capable of reading the data in the same order as the input data.

In step S308, the second WLS unit 306 performs the WLS filter processing on the image data read by the block reading unit 305. The second WLS unit 306 executes the WLS filter processing in the vertical direction for the image data being as large as eight lines. The second WLS unit 306 executes such filter processing W times for each block.

As is clear from the determination of step S305, the second WLS unit 306 executes the WLS filter processing when the line information satisfies y≥n−1. After the line information satisfies y≥n−1, the second WLS unit 306 repeatedly executes the WLS filter processing while sequentially switching the start line.

In step S309, the second writing unit 307 cumulatively writes the image data on which WLS filter processing has been executed by the second WLS unit 306 to the accumulated image buffer 308. In other words, the second writing unit 307 adds and records data for the same pixel in the input image.

The accumulated image buffer 308 is represented by a matrix $v_{cum}$, and the element at the i-th row and the j-th column is denoted by $v_{cum}(i, j)$ herein. Also, the output value from the second WLS unit 306 is represented by a matrix $v_{vwls}$, and the element at the i-th row and the j-th column thereof is denoted by $v_{vwls}(i, j)$. Specifically, the second writing unit 307 writes the data to the accumulated image buffer 308 according to the following expression (8). By executing such calculation, the second writing unit 307 can cumulatively add output values for the same pixel.

$$v_{cum}(m',j) = v_{cum}(m',j) + v_{vwls}(l,j), \quad (8)$$

where m'=(y+1+l) mod n, l={0, 1, ..., n−1}, j={0, 1, ..., W−1}

In step S310, the line writing unit 309 reads image data for one line from the accumulated image buffer 308. When image data is written in the accumulated image buffer 308, that is, when line information satisfies y≥n−1, the line writing unit 309 reads the image data from the accumulated image buffer 308. The line information of the image data read from the accumulated image buffer 308 is calculated by m=(y+1) mod n. When the image data output by the line writing unit 309 is denoted by $v_{out}$, the line writing unit 309 executes normalization by the following equation (9).

$$v_{out}(j) v_{cum}(m,j)/n_{cum} j=\{0,1,\ldots,W-1\} \quad (9)$$

In equation (9), $n_{cum}$ represents the number of times of cumulative addition for each line. Therefore, $v_{out}$ is a value obtained by dividing the output value ($v_{cum}(m, j)$) written in the accumulated image buffer 308 by the cumulative addition times ($n_{cum}$). Note that $n_{cum}$ is calculated by the following equation (10). The cumulative addition times is a numerical value corresponding to an example of redundancy. In a case of $n_{cum}=n$, the redundancy can be said to correspond to the size of the block.

$$n_{cum} = \begin{cases} y+1 & y < n \\ H-y & y > H-n-1 \\ n & \text{otherwise} \end{cases} \quad (10)$$

In step S311, the line information management unit 310 determines whether the line information satisfies y≥H−1. When line information (y) indicates the last line (H−1) (S311: YES), the line writing unit 309 executes processing of step S312. When the line information does not correspond to the last line, that is, when y<H−1 (S311: NO), the line information management unit 310 increments the line information y in step S306.

The line information indicating the last line means that new image data is not input to the accumulated image buffer 308. Therefore, in step S312, the line writing unit 309 reads out all the image data written in the accumulated image buffer 308 and normalizes and outputs the image data.

After reading the image data of a certain line from the accumulated image buffer 308, the line writing unit 309 resets the certain line in the accumulated image buffer 308. Specifically, when resetting the m-th line, the line writing unit 309 writes "0" as illustrated in the following expression (11).

$$v_{cum}(m,j)=0, j=\{0,1,\ldots,W-1\} \quad (11)$$

According to the image processing unit 300 of the present example embodiment, the same effect as the image processing system 200 of the second example embodiment can be achieved. That is, according to the image processing unit 300, the image quality of the output image can be improved by executing redundant WLS filter processing in the vertical direction and cumulative addition and normalization relating to the WLS filter processing.

Furthermore, the image processing unit 300 works well as long as the intermediate image buffer 304 has a storage capacity sufficient for a block. Therefore, for example, the image processing unit 300 can reduce the amount of usage of memory as compared with the case of having storage capacity that can store all the lines of input image data.

Fourth Example Embodiment

Figure 10:
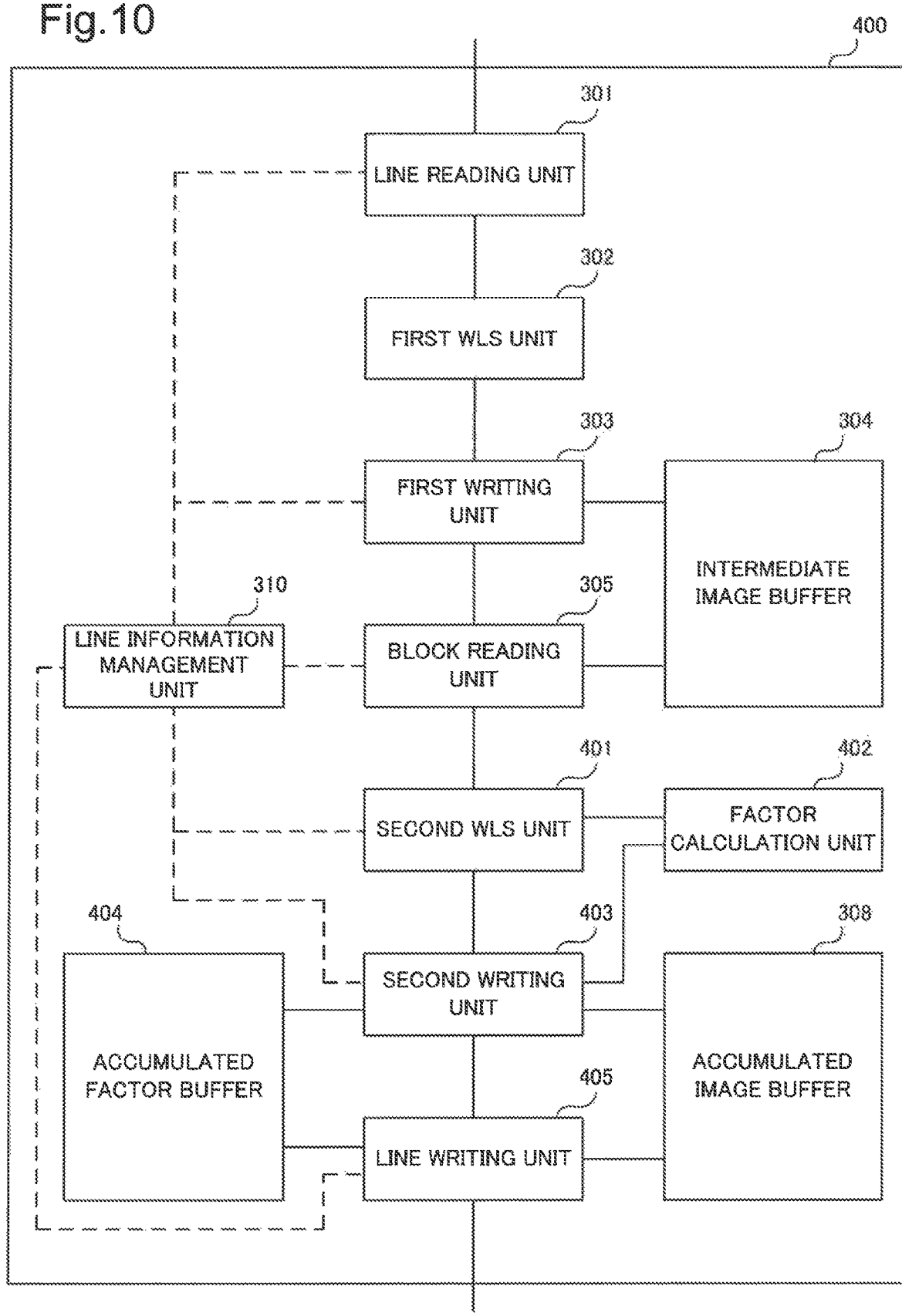
FIG. 10 is a block diagram illustrating another example of a configuration of the image processing unit.

FIG. 10 is a block diagram illustrating a configuration of an image processing unit 400 according to still another example embodiment. The configuration of the image processing unit 400 is partially similar to that of the image processing unit 300 according to the third example embodiment. In the image processing unit 400, constituent elements common to the image processing unit 300 are described using the same reference numerals as those in the third example embodiment. Also, in the present example embodiment, the description about the image processing unit 400 is appropriately omitted with respect to the portion common to the image processing unit 300 according to the third example embodiment.

The image processing unit 400 includes a line reading unit 301, the first WLS unit 302, the first writing unit 303, the intermediate image buffer 304, the block reading unit 305, the accumulated image buffer 308, and the line information management unit 310. These configurations are common to the configurations of the third example embodiment (see FIG. 7). In addition to this, the image processing unit 400 includes a second WLS unit 401, a factor calculation unit 402, a second writing unit 403, an accumulated factor buffer 404, and a line writing unit 405.

Like the second WLS unit 306 of the third example embodiment, the second WLS unit 401 executes one-dimensional WLS filter processing in the vertical direction on the block unit image data read by the block reading unit 305. In addition, the second WLS unit 401 calculates image feature value (hereinafter referred to as "difference information")

based on the difference of the pixel values from the adjacent pixels calculated in the course of the WLS filter processing. The adjacent pixels here refer to one or both of the pixels vertically adjacent to a concerning pixel.

The factor calculation unit 402 calculates a predetermined factor on the basis of the difference information calculated by the second WLS unit 401. Hereinafter, the factor calculated by the factor calculation unit 402 is also referred to as "weight factor". The weight factor is a value correlated with the input image (especially the edge of the input image).

The second writing unit 403 writes the image data to the accumulated image buffer 308 on the basis of the image data on which WLS filter processing has been executed by the second WLS unit 401 and the weight factor calculated by the factor calculation unit 402. The second writing unit 403 writes the weight factor calculated by the factor calculation unit 402 to the accumulated factor buffer 404.

The accumulated factor buffer 404 temporarily stores the weight factor calculated by the factor calculation unit 402. The weight factor is stored cumulatively like the image data stored in the accumulated image buffer 308. The weight factor stored in the accumulated factor buffer 404 corresponds to an example of redundancy.

On the basis of the line information provided by the line information management unit 310, the line writing unit 405 reads the data of one line of the image data stored in the accumulated image buffer 308 and the weight factor stored in the accumulated factor buffer 404. The line writing unit 405 outputs image data normalized using the weight factor.

Figure 11:
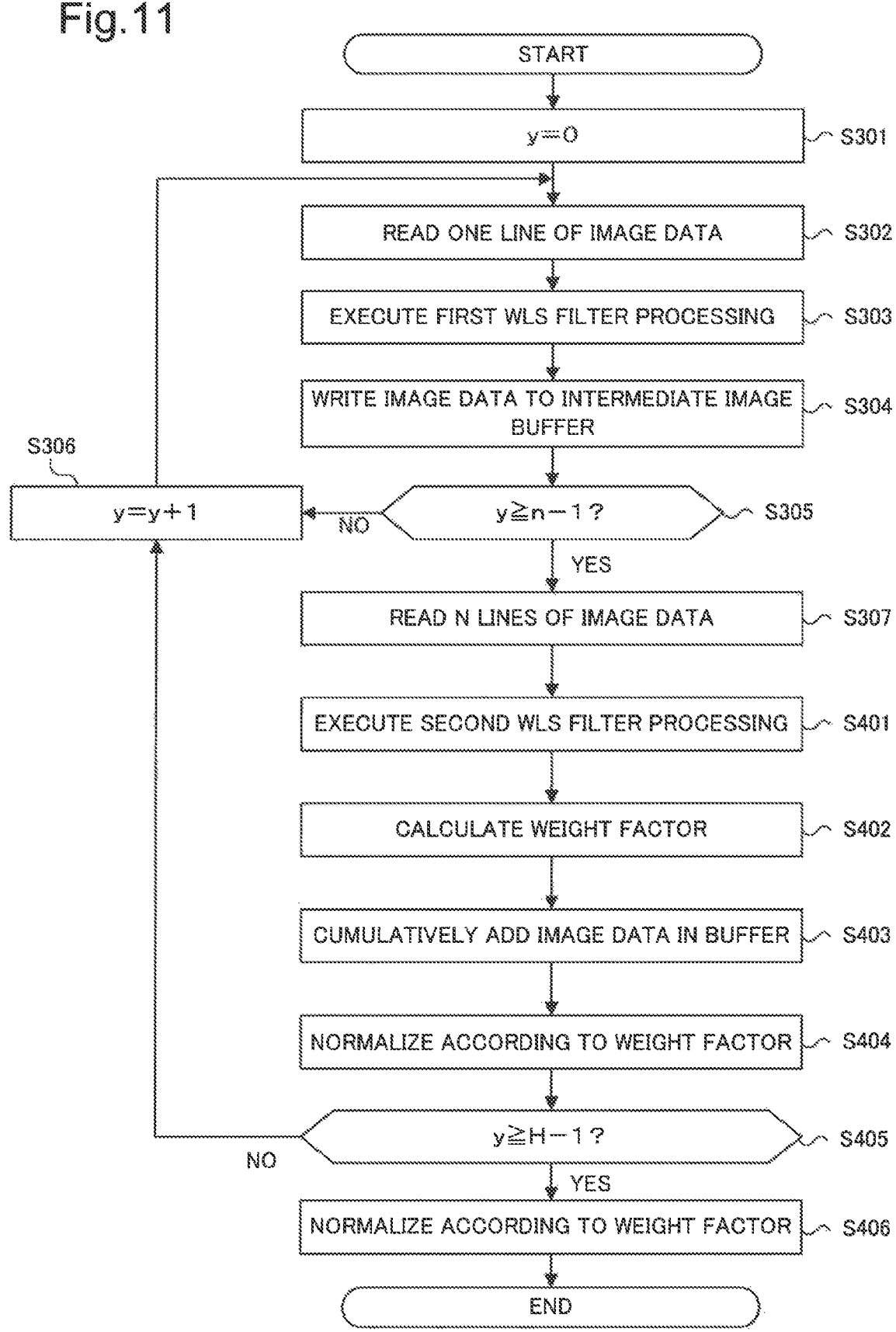
FIG. 11 is a flowchart illustrating another example of processing executed by the image processing unit.

FIG. 11 is a flowchart illustrating processing executed by the image processing unit 400. In the processing illustrated in FIG. 11, the processing in steps S301 to S307 is similar to the processing (see FIG. 8) executed by the image processing unit 300 in the third example embodiment.

In step S401, the second WLS unit 401 executes the WLS filter processing in the vertical direction on the image data read by the block reading unit 305. The second WLS unit 401 calculates the difference information using a guide image in the WLS filter processing. The guide image is, for example, an input image itself or an image including a scene that is same as the scene in the input image and having edges kept in better condition than the input image.

The second WLS unit 401 calculates difference information about adjacent pixels of the guide image in calculating $w_{p,q}(g)$ in the second term on the right side of equation (1). More specifically, when the difference information is denoted by d, the difference information d can be calculated by the following equation (12). The difference information d calculated by the equation (12) is large in an area where the change in the pixel value from the adjacent pixel is large such as an edge or a texture, and is small in a flat area where the change in the pixel value is small.

$$d = \sum_p \left( \sum_{q \in N(p)} (g_p - g_q)^2 \right) \quad (12)$$

The second WLS unit 401 calculates the difference information d for each column of the image data within the block. In the following description, the difference information of the j-th column is denoted by d(j). The second WLS unit 401 provides the difference information d(j) for the factor calculation unit 402.

The difference information is not limited to d in equation (12). The difference information may be other numerical that indicates the difference of the pixel values from the adjacent pixels. For example, the difference information may be the sum of the absolute values of the differences in pixel values compared with adjacent pixels (i.e., $g_p - g_q$), or the sum of the absolute values of the maximum values of the differences or the sum of the absolute values of the (negative) minimum values of the differences.

In step S402, the factor calculation unit 402 calculates the weight factor on the basis of the difference information calculated by the second WLS unit 401. Specifically, when the weight factor is denoted by w(j), the weight factor w(j) can be calculated by the following equation (13). The weight factor w(j) calculated by the equation (13) indicates a small weight when the output value of the WLS filter is obtained from a block containing an edge, and indicates a large weight when the output value of the WLS filter is obtained from a flat block.

$$w(j) = \exp(-d^2(j)/\sigma_d^2), j = \{0, 1, \ldots, W-1\} \quad (13)$$

A specific method of weighting the weight factor is not limited to weighting by a Gaussian function such as equation (13). For example, for a method of weighting, the reciprocal number of the difference information may be used, and a function such as a sigmoid function having a similar property may be used. In short, the weight factor may be set so that the weight factor decreases as the difference information d(j) increases and increases as the difference information d(j) decreases.

In step S403, the second writing unit 403 cumulatively adds the image data to the accumulated image buffer 308 and cumulatively adds weight factors to the accumulated factor buffer 404. More specifically, the second writing unit 403 writes the data to the accumulated image buffer 308 according to the following expression (14). Expression (14) differs from expression (8) in that expression (14) includes a weight factor w(j) in the second term on the right side.

$$v_{cum}(m',j) = v_{cum}(m',j) + w(j) \times v_{vwls}(l,j), \quad (14)$$

where m=(y+1+l)mod n, l={0, 1, . . . , n-1}, j={0, 1, . . . , W-1}

The second writing unit 403 cumulatively adds the weight factor w(j) in the same manner as for the image data. Specifically, when the cumulatively added weight factor is expressed by the matrix $w_{cum}$ and the element at the i-th row and j-th column is denoted by $w_{cum}(i, j)$, the second writing unit 403 writes the weight factor to the accumulated factor buffer 404 according to the following expression (15).

$$w_{cum}(m',j) = w_{cum}(m',j) + w(j), \quad (15)$$

where m'=(y+1+l)mod n, l={0, 1, . . . , n-1}, j={0, 1, . . . , W-1}

In step S404, the line writing unit 405 reads the image data ($v_{cum}(m, j)$) for one line from the accumulated image buffer 308 similarly to the line writing unit 309. Also, the line writing unit 405 reads the cumulatively added weight factor ($w_{cum}(m, j)$) from the accumulated factor buffer 404. Where the image data output by the line writing unit 405 is denoted by $v_{out}$, the line writing unit 405 executes normalization by the following equation (16).

$$v_{out}(j) = v_{cum}(m,j)/w_{cum}(m,j), j = \{0, 1, \ldots, W-1\} \quad (16)$$

In step S405, the line information management unit 310 determines whether line information satisfies y≥H−1. This determination is executed similarly to step S311 (see FIG. 8) of the third example embodiment. In step S406, the line writing unit 405 reads out all the image data written in the accumulated image buffer 308 and normalizes and outputs all the image data similarly to step S404.

When the line writing unit 405 reads the image data of a certain line from the accumulated image buffer 308, the line writing unit 405 resets the certain line in the accumulated image buffer 308 according to equation (11). Likewise, the line writing unit 405 also resets the accumulated factor buffer 404. More specifically, the line writing unit 405 resets the accumulated factor buffer 404 by writing "0" as in the following equation (17).

$$w_{cum}(m,j)=0, j=\{0,1,\ldots,W-1\} \quad (17)$$

As described above, the image processing unit 400 according to the present example embodiment has a configuration to execute normalization on the basis of weight factors related to differences in pixel values compared with adjacent pixels. This configuration allows smoothing processing that keeps (maintains) edges to be performed. Therefore, for example, the image processing unit 400 can improve the image quality in smoothing as compared with the image processing unit 300 of the third example embodiment.

In the third example embodiment, the output value for each pixel is an average value of output values (estimated values) of WLS filter processing performed a plurality of times, in other words, a value obtained by integrating all the estimated values with the same weighting. However, when estimated values from a block that contains an edge are integrated with pixels existing around the edge (non-edge pixels), the edge may become blunt, and the edge of the output image may be blurred.

In contrast, the image processing unit 400 according to the present example embodiment executes normalization by using a weight factor that indicates a small weight for an estimated value obtained from a block containing an edge and indicates a large weight for an estimated value obtained from a flat block not containing an edge. According to such normalization, the influence of the estimated value obtained from a block containing an edge on an output pixel value can be relatively reduced. Therefore, according to the image processing unit 400, blurring that may occur at an edge can be suppressed as compared to the image processing unit 300 of the third example embodiment.

[Modification]

The present disclosure is not limited to the first example embodiment to the fourth example embodiment described above. The present disclosure may include forms to which variations or applications that can be understood by those skilled in the art are applied. For example, the present disclosure includes modifications described below. Also, the present disclosure may include a form in which matters described in the present specification are appropriately combined as necessary. For example, the matters described using a specific example embodiment may be applied to other example embodiments as long as inconsistency does not arise.

(Modification 1) The image processing method executed on the input image data may be different depending on input image or depending on the user's operation. For example, the image processing device may be configured to apply the image processing method according to the third example embodiment to a certain piece of image data and to apply an image processing method of the fourth example embodiment to another piece of image data.

(Modification 2) The memory such as the intermediate image buffer 304, the accumulated image buffer 308, and the accumulated factor buffer 404 may be achieved by one storage medium or may be individually achieved by different storage media.

(Modification 3) There are various variations of specific hardware configuration of each of the devices (the image processing device 100, the image processing system 200, the image processing unit 300, and the image processing unit 400) relating to the present disclosure, and the hardware configuration is not limited to a specific configuration. For example, each of the devices may be achieved using software, or each of the devices may be achieved by a plurality of pieces of hardware that takes charge of part of the processing.

Figure 12:
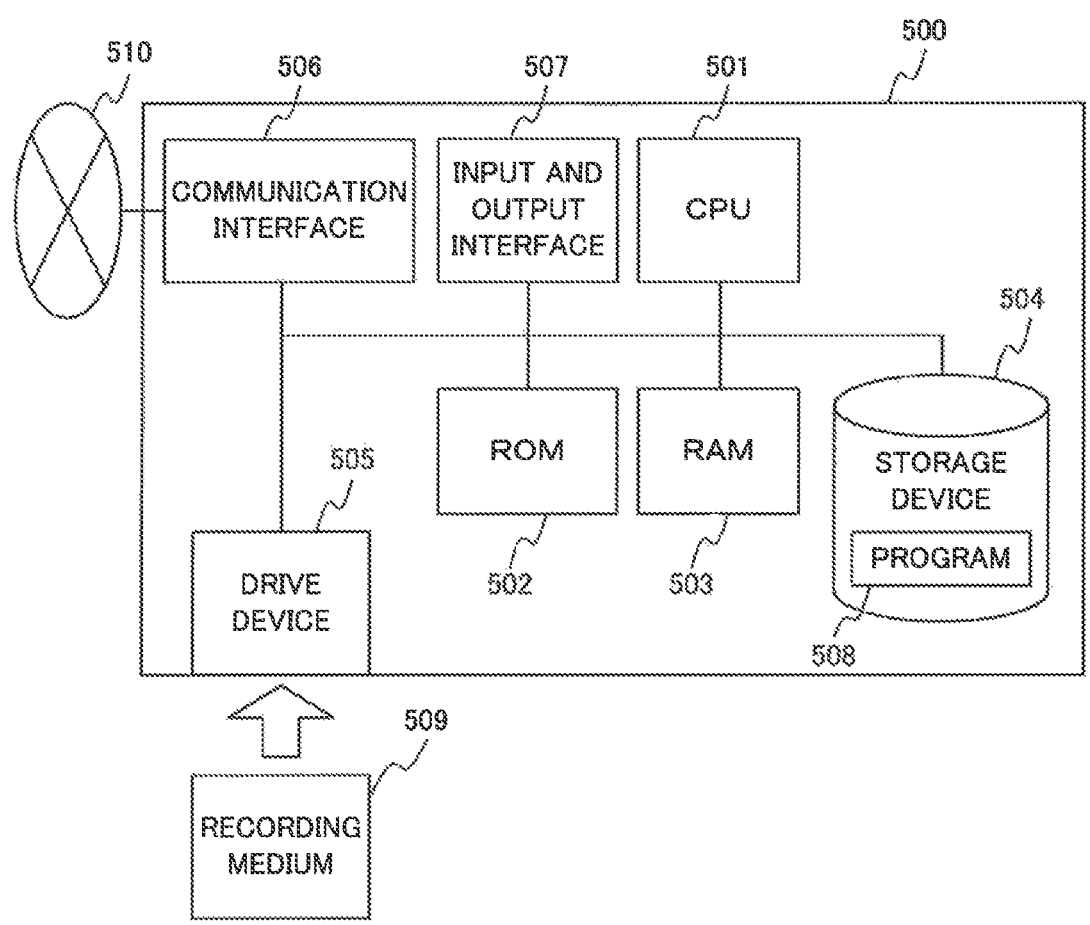
FIG. 12 is a block diagram illustrating an example of a hardware configuration of a computer apparatus.

FIG. 12 is a block diagram illustrating an example of a hardware configuration of a computer apparatus 500 achieving each of the devices. The computer apparatus 500 includes a central processing unit (CPU) 501, a read only memory (ROM) 502, a random access memory (RAM) 503, a storage device 504, a drive device 505, a communication interface 506, and an input and output interface 507. Each device related to the present disclosure may be achieved by the configuration illustrated in FIG. 12 (or by a part thereof).

The CPU 501 executes a program 508 using the RAM 503. The program 508 may be stored in the ROM 502. The program 508 may be recorded on a recording medium 509 such as a memory card, read by the drive device 505, or may be transmitted from an external device via a network 510. The communication interface 506 exchanges data with the external device via the network 510. The input and output interface 507 exchanges data with peripheral devices (input device, display device, etc.). The communication interface 506 and the input and output interface 507 may function as constituent elements for acquiring or outputting data.

The constituent elements of each device may be achieved by a single circuit (processor or the like) or may be achieved by a combination of a plurality of circuits. The circuit (circuitry) referred to herein may be either dedicated or of a general purpose.

The component described as a single device in the above-described example embodiment may be distributed in a plurality of devices. For example, the image processing device 100, the image processing unit 300, or the image processing unit 400 may be achieved by a plurality of computer apparatuses using cloud computing technology or the like.

The present invention has been described above by using the above-described example embodiment as a typical example. However, the invention is not limited to the example embodiments described above. That is, in the present invention, various modes that can be understood by those skilled in the art can be applied within the scope of the present invention.

The present application claims the benefits of priority based on Japanese Patent Application No. 2016-118057, filed on Jun. 14, 2016, the entire disclosure of which is incorporated herein by reference.

REFERENCE SIGNS LIST 100 image processing device
110 first smoothing unit
120 second smoothing unit
200 image processing system
210 input unit
220 image processing unit
221 first smoothing unit
222 second smoothing unit 223 cumulative addition unit
224 normalization unit
230 output unit
300 image processing unit
301 line reading unit
302 first WLS unit
303 first writing unit
304 intermediate image buffer
305 block reading unit
306 second WLS unit
307 second writing unit
308 accumulated image buffer
309 line writing unit
310 line information management unit
400 image processing unit
401 second WLS unit
402 factor calculation unit
403 second writing unit
404 accumulated image buffer
405 line writing unit
500 computer apparatus

What is claimed is:

1. An image processing device comprising:
a memory; and
a processor coupled to the memory and configured to:
execute one-dimensional first smoothing processing based on a weighted least squares method on an input image in each predetermined line in a first direction; and
execute one-dimensional second smoothing processing based on a weighted least squares method on the input image on which the first smoothing processing has been performed, for each predetermined block in a second direction different from the first direction.

2. The image processing device according to claim 1, wherein
the processor is configured to execute the second smoothing processing for each block depending on redundancy;
cumulatively add input images on which the second smoothing processing has been executed; and
normalize the cumulatively added input image according to the redundancy.

3. The image processing device according to claim 2, wherein
the redundancy varies depending on an image feature value in the second direction of a guide image related to the input image.

4. The image processing device according to claim 3, wherein
the image feature value represents a difference in a pixel value between a pixel in the guide image and one or more pixels adjacent to the pixel.

5. The image processing device according to claim 2, wherein the redundancy matching a size of the block is used.

6. An image processing method comprising:
executing one-dimensional first smoothing processing based on a weighted least squares method on an input image in each predetermined line in a first direction; and
executing one-dimensional second smoothing processing based on a weighted least squares method on the input image on which the first smoothing processing has been performed, for each predetermined block in a second direction different from the first direction.

7. The image processing method according to claim 6, further comprising
executing the second smoothing processing for each block according to redundancy;
cumulatively adding input images on which the second smoothing processing has been executed; and
normalizing the cumulatively added input image according to the redundancy.

8. The image processing method according to claim 7, wherein
the redundancy varies depending on an image feature amount in the second direction of a guide image related to the input image.

9. The image processing method according to claim 8, wherein
the image feature amount represents a difference in a pixel value between a pixel in the guide image and one or more pixels adjacent to the pixel.

10. The image processing method according to claim 7, wherein the redundancy matching a size of the block is used.

11. A non-transitory computer-readable storage medium storing a program that causes a computer to perform:
processing for executing one-dimensional first smoothing processing based on a weighted least squares method on an input image in each predetermined line in a first direction; and
processing for executing one-dimensional second smoothing processing based on a weighted least squares method on the input image on which the first smoothing processing has been performed, for each predetermined block in a second direction different from the first direction.

12. The storage medium according to claim 11, wherein the program further causes the computer to perform:
executing the second smoothing processing for each block according to redundancy;
cumulatively adding input images on which the second smoothing processing has been executed; and
normalizing the cumulatively added input image according to the redundancy.

13. The storage medium according to claim 12, wherein
the redundancy varies depending on an image feature amount in the second direction of a guide image related to the input image.

14. The storage medium according to claim 13, wherein
the image feature amount represents a difference in a pixel value between a pixel in the guide image and one or more pixels adjacent to the pixel.

15. The storage medium according to claim 12, wherein the redundancy matching a size of the block is used.

* * * * *